United States Patent
Qi et al.

(10) Patent No.: US 10,802,923 B2
(45) Date of Patent: Oct. 13, 2020

(54) METHOD AND APPARATUS FOR INCREMENTAL BACKUP BASED ON FILE PATHS AND A PREFIX TREE

(71) Applicant: EMC IP Holding Company LLC, Hopkinton, MA (US)

(72) Inventors: Wei Qi, Beijing (CN); Xin Zhong, Beijing (CN); Friar Yangfeng Chen, Beijing (CN); Wenxuan Yin, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 375 days.

(21) Appl. No.: 15/268,789

(22) Filed: Sep. 19, 2016

(65) Prior Publication Data

US 2017/0083406 A1 Mar. 23, 2017

(30) Foreign Application Priority Data

Sep. 21, 2015 (CN) .......................... 2015 1 0604922

(51) Int. Cl.
  *G06F 11/14* (2006.01)
  *G06F 16/901* (2019.01)
  *G06F 16/11* (2019.01)

(52) U.S. Cl.
  CPC ........ *G06F 11/1451* (2013.01); *G06F 16/113* (2019.01); *G06F 16/9027* (2019.01)
  (Continued)

(58) Field of Classification Search
  CPC ........... G06F 11/1451; G06F 17/30961; G06F 2201/80; G06F 2201/805; G06F 2201/82;
  (Continued)

(56) References Cited

U.S. PATENT DOCUMENTS 7,266,574 B1 * 9/2007 Boudrie .............. G06F 11/1451
                                                                707/646
2004/0143713 A1  7/2004 Niles et al.
(Continued)

FOREIGN PATENT DOCUMENTS

| CN | 101477487 A | 7/2009 |
| CN | 102236589 A | 11/2011 |
| JP | 2012-252418 | * 12/2012 ............. G06F 12/00 |

OTHER PUBLICATIONS

Chinese Office Action issued in Counterpart Application Serial No. 2015106049228 dated Aug. 20, 2019.
(Continued)

*Primary Examiner* — Hares Jami
(74) *Attorney, Agent, or Firm* — Brian J. Colandreo; Mark H. Whittenberger; Holland & Knight LLP

(57) ABSTRACT

Embodiments of the present disclosure relate to a method and apparatus for incremental backup. The method comprises receiving a set of file paths to be backed up and parsing each file path in the set of file paths to construct a prefix tree. The method further comprises traversing the prefix tree to read an ordered set of file paths in the prefix tree and performing an incremental backup sequentially according to the ordered set of file paths. Embodiments of the present disclosure sort a set of file paths to be backed up using a prefix tree that shares common path prefixes. Thus, embodiments of the present disclosure can achieve fast sort of the set of file paths, and can effectively save storage space needed for sorting a considerable number of file paths in the memory, thereby reducing the times of comparing file names when sorting file paths.

18 Claims, 7 Drawing Sheets

(52) U.S. Cl.
CPC .... *G06F 2201/80* (2013.01); *G06F 2201/805* (2013.01); *G06F 2201/81* (2013.01); *G06F 2201/82* (2013.01); *G06F 2201/84* (2013.01)

(58) Field of Classification Search
CPC ............. G06F 11/1446; G06F 11/1448; G06F 16/9027; G06F 16/113
USPC .................................................. 707/640–673
See application file for complete search history.

(56) References Cited

U.S. PATENT DOCUMENTS

2006/0149766 A1* 7/2006 Ghoting ............ G06F 17/30539
2008/0243936 A1* 10/2008 Li ....................... G06F 16/1734
2012/0203742 A1* 8/2012 Goodman ........... G06F 11/1451
707/646
2012/0311589 A1* 12/2012 Agarwal ............... G06F 9/5066
718/102

OTHER PUBLICATIONS

Second Chinese Office Action issued in Counterpart Application Serial No. 2015106049228 dated Nov. 26, 2019.
Third Chinese Office Action issued in counterpart Application Serial No. 2015106049228 dated Mar. 27, 2020.
Zhang, X. et al., "Research on Text Classification Based on Rule Mining by Granule Network Constructing", vol. 35, No. 12, China Academic Journal Electronic Publishing House, Abstract, (2008), pp. 167-170.
You, Y. et al., "Construction of fault-tolerant synopsis over data stream based on prefix-tree", Journal of Beijing University of Aeronautics and Astronautics, Abstract, vol. 37, No. 5, May 31, 2011, pp. 564-568.
Wang, T. et al., "Digital Media Content Management Technology and Practice", China Media University Press, 1st Edition, May 31, 2014, pp. 64-66.
Fourth Chinese Office Action issued in counterpart Chinese Application Serial No. 2015106049228 dated Jun. 19, 2020, 8 pages.

\* cited by examiner

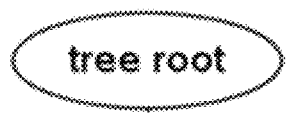
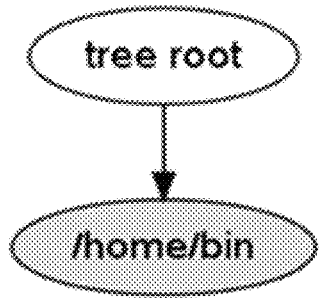
Fig. 3A          Fig. 3B
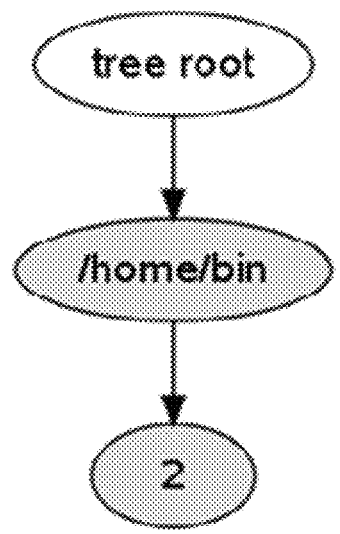
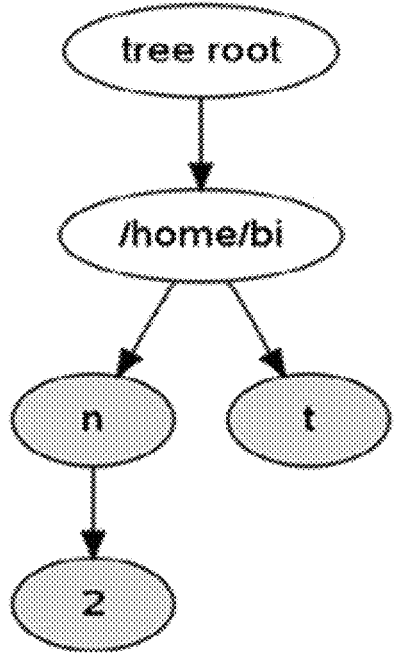
Fig. 3C          Fig. 3D

METHOD AND APPARATUS FOR INCREMENTAL BACKUP BASED ON FILE PATHS AND A PREFIX TREE

RELATED APPLICATION

This application claim priority from Chinese Patent Application Number CN201510604922.8, filed on Sep. 21, 2015 at the State Intellectual Property Office, China, titled "INCREMENTAL BACKUP METHOD AND APPARATUS," the contents of which is herein incorporated by reference in its entirety.

FIELD

Embodiments of the present disclosure generally relate to data backup technologies, and more specifically relate to a method and apparatus for incremental backup.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

In view of the above, embodiments of the present disclosure provide a method and apparatus for incremental backup, which can perform fast sort to the set of file paths and save storage space needed to sort a considerable number of file paths in the memory.

According to one aspect of the present disclosure, there is disclosed a method for incremental backup, the method comprises receiving a set of file paths to be backed up and parsing each file path in the set of file paths to construct a prefix tree. The method further comprises traversing the prefix tree to read an ordered set of file paths in the prefix tree and performing an incremental backup sequentially according to the ordered set of file paths.

BRIEF DESCRIPTION OF DRAWINGS

Features, advantages and other aspects of various embodiments of the present disclosure will become more apparent in conjunction with the accompanying drawings with reference to the following detailed depiction, and several embodiments of the present disclosure are illustrated here in an example, but non-limitative, manner, in the accompanying drawings:

FIGS. 3A-3D schematically illustrate examples of a process of constructing a prefix tree as shown in FIG. 2;

DETAILED DESCRIPTIONS

Figure 1:
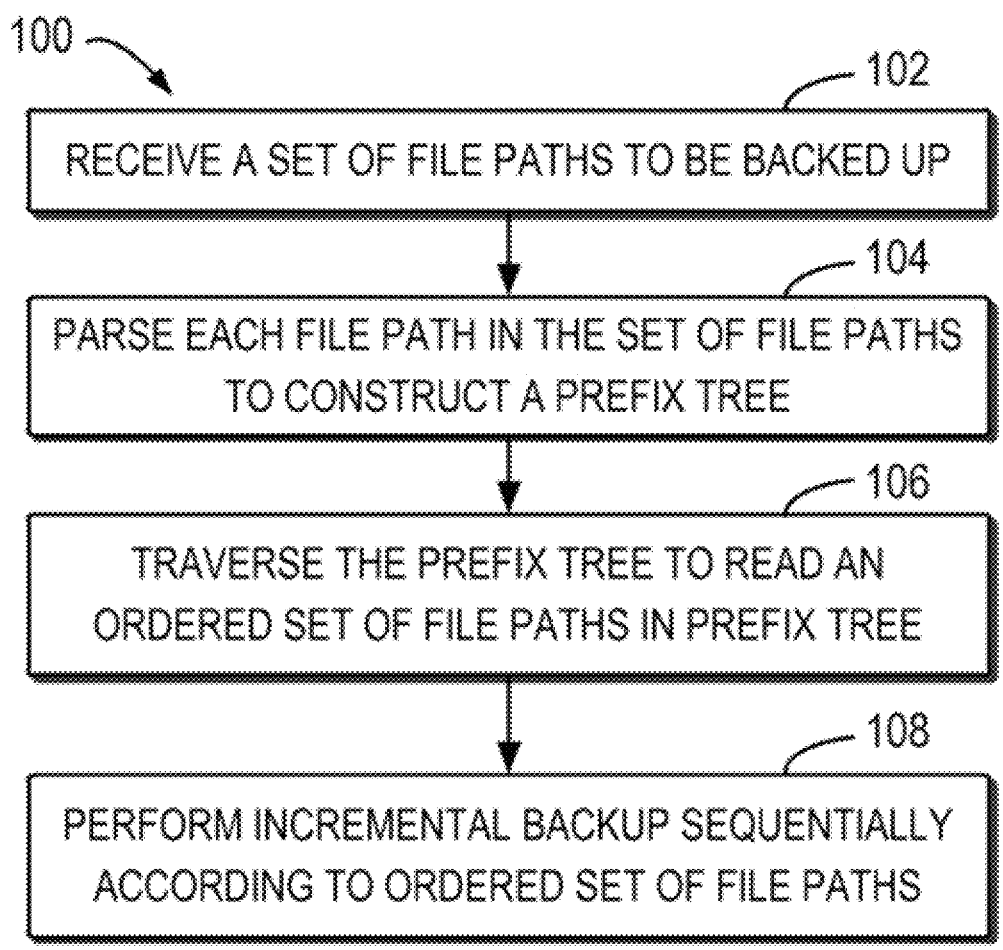
FIG. 1 schematically illustrates a flow diagram of a method 100 for incremental backup according to embodiments of the present disclosure.

Various example embodiments of the present disclosure will be described in detail with reference to the accompanying drawings. The flow diagrams and block diagrams in the accompanying drawings illustrate system architecture, functions, and operations which are possibly implemented by the method and system according to various embodiments of the present disclosure. It should be understood that each block in the flow diagrams or block diagrams may represent a unit, a program segment, or a part of code; the unit, program segment, or part of code may include one or more executable instructions for implementing logical functions as prescribed in various embodiments. It should also be noted that in some alternative implementations, the functions indicated in the blocks may also occur in a sequence different from what is indicated in the drawings. For example, two consecutively expressed blocks actually may be executed substantially in parallel, or they sometimes may be executed in a reversed order, dependent on the involved functions. Likewise, it should be noted that each block in the flow diagrams and/or block diagrams, and a combination of blocks in the flow diagrams and/or block diagrams, may be implemented using a specific hardware-based system that performs prescribed functions or operations, or may be implemented using a combination of specific hardware and computer instructions.

The terms "include," "comprise" and similar terms as used herein should be understood as open terms, that is, "include/comprise, but not limited to." The term "based on" refers to "based at least partially on." The term "one embodiment" refers to "at least one embodiment." The term "another embodiment" or "a further embodiment" indicates "at least one further embodiment." Relevant definitions of other terms will be provided in the depiction below.

It should be understood that these example embodiments are only provided for enabling those skilled in the art to better understand and then further implement embodiments of the present disclosure, which are not intended to limit the scope of the present invention in any manner.

Traditionally, incremental backup refers to backing up the modified or newly added data or information since the last backup, which usually has to traverse all files. Generally, the fast incremental backup discovers differential files and metadata through a snapshot technology and backs them up. Conventionally, during the process of fast incremental backup, incremental file paths are derived by comparing the differential files and metadata between two snapshots. Typically, a sequence of the file paths are successively returned based on their positions in the snapshot such that it is impossible to ensure the sequence of returned file paths. However, generally, a data management application (DMA) for incremental backup usually can only perform batch backup processing to a specific sequence of file paths. Therefore, traditionally, during the procedure of incremental backup, it is needed to perform sort of a set of generated file paths.

Generally, fast sort is used to sort the set of generated file paths. However, conventionally, in some cases, the number of files that need to be sorted may amount to an order of millions, such as 27 million files, and a file path is usually a longer character string, such as the maximum file path is about 4 KB. Traditionally, for so many file numbers and so long file path, if the fast sort is performed in a memory, it needs at most 100 GB (27 million×4 KB) to the utmost. In addition, typically, if the sort is moved into the disk for processing (also referred to external sort), then a rather long sorting time needs to be consumed because the speed of the disk is far lower than that of the memory.

Therefore, traditionally, under the situation that the traditional fast sort method is only good at number sorting and the existing TRIE tree is only suitable for sorting a shorter character string (such as a word), it is an imminent problem to be solved as to how to quickly and efficiently sort a set of file paths to be backed up and how to save the storage space for the set of file paths to be backed up.

In view of the above, embodiments of the present disclosure provide a method and apparatus for incremental backup, which can perform fast sort to the set of file paths and save storage space needed to sort a considerable number of file paths in the memory.

According to one aspect of the present disclosure, there is disclosed a method for incremental backup, the method comprises receiving a set of file paths to be backed up and parsing each file path in the set of file paths to construct a prefix tree. The method further comprises traversing the prefix tree to read an ordered set of file paths in the prefix tree and performing an incremental backup sequentially according to the ordered set of file paths.

According to one embodiment of the present disclosure, the file paths to be backed up at least include an alphabet and a special character. According to another embodiment of the present disclosure, all sub-nodes of any node in the prefix tree have a common prefix that includes one or more characters. According to a further embodiment of the present disclosure, the prefix tree is initially an empty tree.

According to one embodiment of the present disclosure, the step of parsing each file path in the set of file paths to construct a prefix tree comprises: inserting each file path in the set of file paths into the prefix tree sequentially, and comparing each file path with the prefix in response each file path being inserted.

According to another embodiment of the present disclosure, the step of parsing each file path in the set of file paths to construct a prefix tree comprises: allocating common prefix of a plurality of paths having common prefix to a node, wherein the common prefix includes a plurality of characters.

According to a further embodiment of the present disclosure, the step of comparing each file path with the prefix comprises: for each file path, performing prefix matching between the file path and nodes of a N-th layer in the prefix tree, wherein N≥1 and the initial value of N is 1; inserting the file path as a new node of the N-th layer in response to failing to find a common prefix between the file path and all nodes of the N-th layer; and inserting the file path as a new sub-node of a given node in response to finding a common prefix between file path and one of the N-th layer so that initial characters of all nodes of N+1-th layer are sorted according to ASCII code sizes.

According to one embodiment of the present disclosure, the step of inserting the file path as a new sub-node of a given node comprises: replacing characters in given node with the common prefix in response to the common prefix is a part of characters in given node. Besides, after replacing characters in given node with the common prefix, the node content of the newly inserted file path is the newly inserted file path minus the common prefix, and the remaining part in the preceding node excluding the common prefix is also inserted as a new sub-node of this node. For example, in a case that the original node is "aaabbb", and the newly inserted path is "aaaccc"; after the new path is inserted, the original node is updated to "aaa", and the updated original node generates a sub-node "bbb" and a sub-node "ccc".

According to another embodiment of the present disclosure, in response to constructing a prefix tree, all nodes of the same layer are sorted based on an ASCII code sizes of the initial characters in the nodes. According to a further embodiment of the present disclosure, in response to constructing the prefix tree, values are assigned to the nodes corresponding to file paths.

According to one embodiment of the present disclosure, the step of traversing a prefix tree to read an ordered set of file paths in the prefix comprises: traversing a prefix tree using a depth first search in order to sequentially read all nodes that have values as the ordered set of file paths.

According to another aspect of the present disclosure, there is provided an apparatus for incremental backup, the apparatus comprises a receiving unit configured to receive a set of file paths to be backed up and a parsing unit configured to parse each file path in the set of file paths to construct a prefix tree. The apparatus further comprises a traversing unit configured to traverse the prefix tree to read an ordered set of file paths in the prefix tree and a backup unit configured to perform an incremental backup sequentially according to the ordered set of file paths.

Embodiments of the present disclosure may bring about at least one of the following technical effects. Embodiments of the present disclosure sort a set of file paths to be backed up using a prefix tree that shares common path prefix, thereby reducing the number of comparing character strings of the paths. Thus, embodiments of the present disclosure can achieve fast sort of the set of file paths. Meanwhile, storage space of repetitive character strings is greatly reduced by means of the common prefix such that the storage space of file paths can be saved.

In embodiments of the present disclosure, a network data management protocol (NDMP) represents a general protocol between backup software and a storage device, which is used to transmit data between a network attached storage (NAS) device and a backup device. In various embodiments, NDMP removes the need of transmitting data through the backup server per se, thereby increasing the backup speed and alleviating loads on the backup server.

In embodiments of the present disclosure, data management application (DMA) may be an application for creating and controlling NDMP sessions, which creates and runs an NDMP session using the DNMP and an NDMP-compatible storage product, thereby realizing effective data management that includes executing backup and recovery of data volumes, and replicating a file system, and the like.

In embodiments of the present disclosure, portable archive interchange (PAX) may refers to a network server document protocol working with a standard UNIX tape format, which may provide file-level backup and recovery operations. In these embodiments, the PAX may support level 0-10 backup, where level 0 represents full backup, while levels 1-10 represents different levels of incremental backup, where level 10 backup may be used for backing up all files modified since the latest backup.

In embodiments of the present disclosure, a file traversal service (FTS) may be used for traversing files in the file system. In these embodiments, a backup thread may calculate whether the file needs to be backed up based on metadata (such as timestamp) of the files, and these files may then be fed to the PAX for backup.

In embodiments of the present disclosure, a file incremental backup system may be an incremental backup system that provides functions such as a snapshot, which may provide an application program interface (API) to compare differences between file snap systems so as to realize incremental backup. In various embodiments, Fast incremental backup may be a backup solution with a superior performance over the traditional backup method, which can discover files to be backed up more effectively.

In embodiments of the present disclosure, direct access recovery (DAR) may be used for recovering files according to a set of file paths to be backed up. In certain embodiments, with a DAR-enabled recovery, the DMA can specify an exact location for backing up files in a memory (such as a tape device). In many embodiments, the NDMP server only needs to read data of a single file to be recovered, which reduces the information volume to be handled and significantly reduces the recovery time.

In embodiments of the present disclosure, a file history is used for describing metadata information upon each backup, for example timestamp, access rights and so forth. The file history may be defined in the NDMP, and files that need to be retrieved are selected by backup software (such as DMA), thereby facilitating implementation of direct access recovery.

In embodiments of the present disclosure, file path refers to an operating system path of a file. In various embodiments, file paths are typically featured as long path and many repetitions. For example, in some embodiments, in an example set of file paths shown in table 1 below, the shortest file path has 29 characters, and the longest common path prefix between paths amounts to 35 characters.

TABLE 1

/home/admin/software/emacs/bin/emacsclient
/home/admin/software/emacs/bin
/home/admin/software/emacs/bin/emacs
/home/admin/software/emacs/bin/emacs-24.4

In embodiments of the present disclosure, path sort refers to sorting a unordered set of file paths according to a certain specific sequence so as to generate an ordered set of file paths. In one embodiment, an unordered set of file paths in Table 2 is re-arranged (in an alphabetical order) into an ordered set of file paths in Table 3.

TABLE 2

/root/bin/ls
/home/bin
/home

TABLE 2-continued

/root/bin
/root

TABLE 3

/home
/home/bin
/root
/root/bin
/root/bin/ls

FIG. 1 schematically illustrates a flow diagram of a method 100 for incremental backup according to embodiments of the present disclosure. In step 102, a set of file paths to be backed up is received. Because file backup software (such as DMA) generally only perform batch processing to file paths of a specific sequence, the set of file paths to be backed up needs to be sorted after calculating modified paths since the last backup in the file incremental backup system. Thus, the method 100 starts with receiving a set of file paths to be backed up.

According to one embodiment of the present disclosure, the file path to be backed up may at least includes an alphabet and a special character. As indicated in Tables 1-3 above, each file path at least include an alphabets (such as "o") and special characters (such as "f"). The set of file paths to be backed up presents an unordered sort with a unit of row(s).

In step 104, each file path in the set of file paths is parsed to construct a prefix tree. The prefix tree is an ordered data structure for storing dynamic data. A key in the prefix tree is always represented as a character string, such as one or more characters. The key of a node in the prefix tree is not stored in given node, which is different from a binary search tree. On the contrary, the key of a node in the prefix tree is a sum of character string values saved by all nodes on the path from the root node to the current node, while its value is saved on the current node. According to embodiments of the present disclosure, all sub-nodes of any node in the prefix tree have a common prefix that includes one or more characters. In the prefix tree, values are only assigned to nodes that have a file path, instead of all nodes. That is, only nodes corresponding to specific paths have a value, wherein a character strings included in all nodes on a path from the root node to the current node of the tree is regarded as the key.

Figure 2:
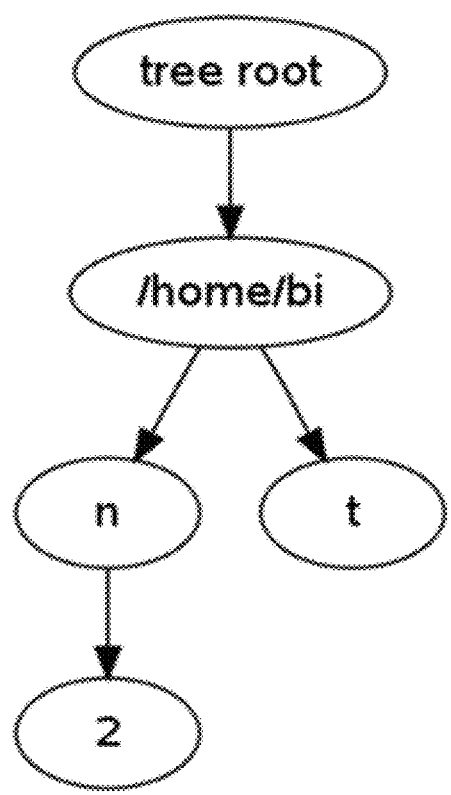
FIG. 2 schematically illustrates an example of a prefix tree according to one embodiment of the present disclosure.

FIG. 2 schematically illustrates an example of a prefix tree according to one embodiment of the present disclosure. Table 4 below shows a set of file paths corresponding to the prefix tree. The specific constructing process of the prefix tree refers to FIGS. 3A-3D. In the example of FIG. 2, the unordered set of file paths in Table 4 is constructed into an ordered prefix tree. Compared with the traditional method (such as fast sort), the common prefix "/home/bi" and "/home/bin" in the prefix tree of FIG. 2 are merged, which theoretically can save more than a half storage space, such as 25 bytes.

TABLE 4

/home/bin
/home/bin2
/home/bit

Traditional TRIE is suitable for the shorter character string (such as word). Each node only represents one character, resulting in too many tree hierarchies. In addition, the TRIE tree performs matching through a Hash algorithm, the spatial complexity of sorting is rather high. However, it may be seen from FIG. 2 that compared with the traditional TRIE tree, prefixes in embodiments of the present disclosure can be applied to situations of backing up longer character strings, which are suitable for sorting large-scale character strings (such as file path). Moreover, embodiments of the present disclosure have a lower spatial complexity and less tree hierarchies, for example, the characters "/home/bi" is only needed to be represented in given node.

FIGS. 3A-3D schematically illustrate examples of a process of constructing a prefix tree in FIG. 2. First, in FIG. 3A, an empty tree is built. The prefix tree is initially an empty tree. As shown, the empty tree merely comprises a tree root, without any sub-node.

In FIG. 3B, a first path "/home/bin" in the set of file paths is inserted in the empty tree. Because the prefix tree does not have any node currently, the first path is only compared with an empty character " " in the empty tree. Because no common prefix is found, the first path "/home/bin2" is directly inserted as a sub-node of the tree root.

In FIG. 3C, a second path "/home/bin2" in Table 4 is inserted. The inserted second path "/home/bin2" is compared with the node "/home/bin" in the prefix tree. Because the common prefix is "/home/bin", the remaining character "2" of the second path is saved to a newly created lower-level node and regarded as a sub-node of the common prefix character string "/home/bin". If no common prefix is found between the newly inserted path and all sub-nodes, then as shown in FIG. 3B, the newly inserted path is directly inserted to the current layer of the prefix tree and arranged sequentially. For example, all nodes from the same layer are sorted based on ASCII code sizes of the initial characters in the nodes. In some embodiments, the ASCII of the symbol "/" is 47; however, in order to satisfy sorting requirements, the symbol "/" needs special consideration. For example, during the sorting process, the symbol "/" may be sorted as the number "0."

In FIG. 3D, a third path "/home/bit" is inserted. First, this path is compared with a sub-node of the tree root. With a common prefix "/home/bi", the original node "/home/bin" at the first layer will be split into the common prefix "/home/bi" and another "n". The character "t" in the newly inserted path will be saved to the newly created lower-layer node; meanwhile, node "n" will also be created as a sub-node of the common prefix "/home/bi", while node "2" will correspondingly descend by one level to become a sub-node of the node "n". Therefore, the currently generated node "/home/bin" is dynamically updated to "/home/bi".

In the constructed prefix tree in FIG. 3D, the grey-padded node is labeled to have a value. If the path corresponds to the value, then the final node of the file path will have a value. For example, the value of the path "/home/bin2" will be saved on the node "2"; likewise, the value of the path "/home/bin" will be saved on the node "n". During the constructing process of the prefix in FIG. 3, the comparison time with respect to the inserted path depends on the length of the character string, which is different from the traditional fast sort method, whose comparison time depends on the number of paths.

Based on the constructing process of the prefix tree in FIG. 3A-3D, it can be seen that the step of parsing each file path in the set of file paths to construct a prefix tree may comprise: inserting each file path in the set of file paths into the prefix tree sequentially, and comparing the each file path with the prefix tree. Optionally, common prefix of a plurality of paths having common prefix are allocated to a node, wherein at least one of the common prefixes includes a plurality of characters. Alternatively, for each file path, the file path is prefix matched with the nodes of N-th layer in the prefix tree, wherein N≥1 and the initial value of N is 1. Then, if no common prefix is found between the file path and all nodes of the N-th layer, the file path is inserted as a new node of the N-th layer. If a common prefix is found between the file path and given node of the N-th layer, the file path is inserted as a new sub-node of the given node, and N increases by 1. Next, the step of inserting is repeatedly performed on the N+1-th layer, until the path has been inserted to the node. Moreover, in the case that the file path is inserted, it is ensured that initial characters of all nodes on the same layer are sorted according to ASCII size.

Figure 4:
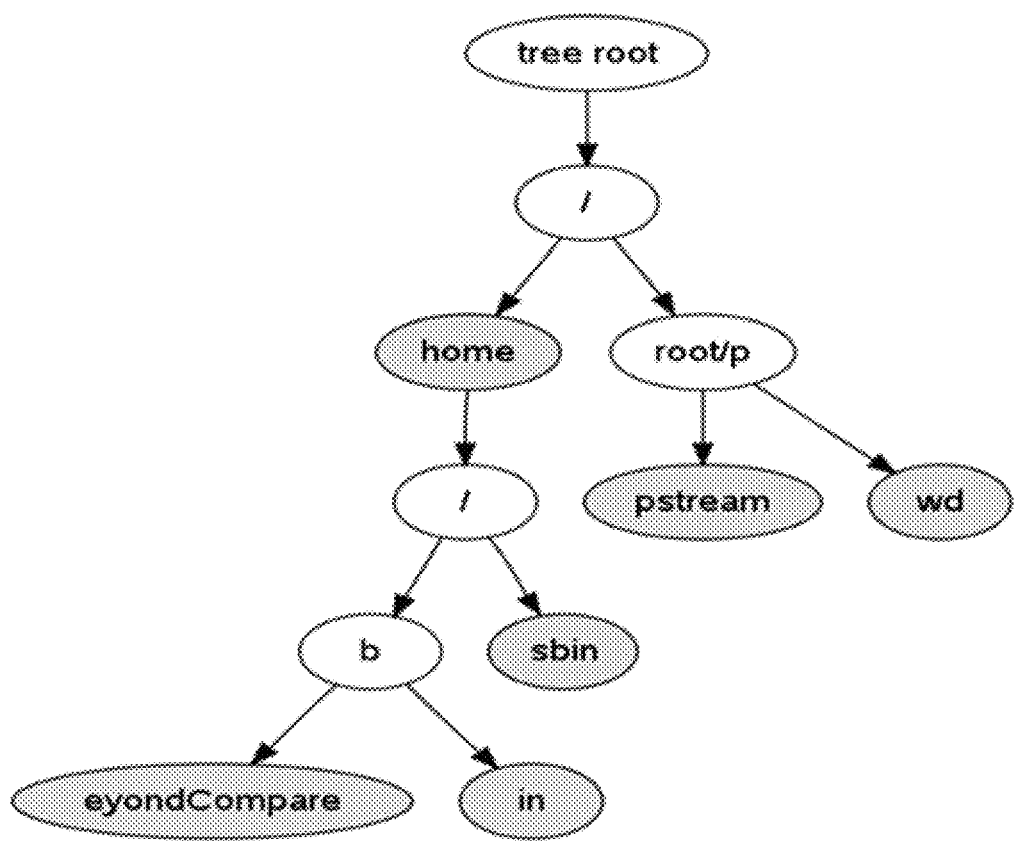
FIG. 4 schematically illustrates an example of a prefix tree according to another embodiment of the present disclosure.

FIG. 4 schematically illustrates an example of a prefix tree according to another embodiment of the present disclosure. Table 5 below illustrates a set of file paths corresponding to the prefix tree, wherein in the prefix tree of FIG. 4, the node "home" in the second-layer, the node "eyondCompare" in the fifth-layer, the node "in" in the fifth-layer, the node "sbin" in the fourth-layer, the node "pstream" in the third-layer, and the node "wd" in the third-layer have values thereon, respectively. Moreover, values of these nodes sequentially correspond to the sorted set of file paths.

TABLE 5

/home
/home/bin
/home/sbin
/home/beyondCompare
/root/pwd
/root/ppstream

Continue reference to FIG. 1, in step 106, the prefix tree is traversed to read an ordered set of file paths in the prefix tree. According to one embodiment of the present disclosure, the prefix tree is traversed using a depth first search so as to sequentially read all nodes that have values as the ordered set of file paths. When traversing the prefix tree using a depth first search, if it is found that the traversed node is an end of a path, the character strings included in all nodes along the path from the root node to the current node form one path. An ordered set of file paths may be derived by repeating the search process above.

The depth first search algorithm is a common tree search algorithm in the art, which is used for searching nodes in a tree as "deep" as possible. The depth first search traverse starts from a vertex. First, the vertex is accessed; then it starts from its respective adjacent points that are not accessed yet to search the traverse diagram in depth first search, until all vertexes having path communication with vertex in the figure are accessed. If there are other vertexes that have not been accessed at this time, another vertex that has not been accessed will be selected as the initial point. The above process is repeated, until all vertexes in the figure have been accessed. In method 100, with the path and file attributes are inserted into the prefix tree, an ordered set of paths are organized in the prefix tree; and an ordered path sequence is generated based on the prefix tree using the depth first search. With the prefix tree in FIG. 4 as an example, the step of traversing is performed using a depth first search; the ordered set of file paths read from the prefix tree are: "home", "/home/beyondCompare", "/home/bin", "/home/sbin", "root/ppstream," and "/root/pwd."

In step 108, incremental backup is performed sequentially according to an ordered set of file paths. For example, the data management application (DMA) receives the ordered set from the prefix tree and performs the corresponding incremental backup.

According to embodiments of the present disclosure, common prefix character strings in different paths will be merged, which reduces storage of repetitive paths and effectively increases storage efficiency. In traditional fast sort, too many unnecessary comparisons are performed, for example, fast sort needs to compare two paths. The method of the present disclosure can reduce the times of sort comparison, which is particularly applicable to paths having a longer common prefix. For example, in the set of file paths in Table 6 below, the fast sort method needs Log(n) times of comparison between paths with a common prefix "/c4_working/code/fastIncBk/sade/src/dart/Dart/server/src/ccmd/catalog/messages/STATU S/", so as to find a correct location of one path therein; therefore, the time complexity of the fast sort is LOG(5)*86. On the contrary, in the method 100 according to embodiments of the present disclosure, for one newly inserted path, it is only needed to compare once. In a most preferable occasion, the time complexity in the method of the present disclosure may be 86.

TABLE 6

/c4_working/code/fastIncBk/sade/src/dart/Dart/server/src/ccmd/catalog/messages/STATUS/VBB.msg
/c4_working/code/fastIncBk/sade/src/dart/Dart/server/src/ccmd/catalog/messages/STATUS/VLU.msg
/c4_working/code/fastIncBk/sade/src/dart/Dart/server/src/ccmd/catalog/messages/STATUS/VDM.msg
/c4_working/code/fastIncBk/sade/src/dart/Dart/server/src/ccmd/catalog/messages/STATUS/TASK.msg
/c4_working/code/fastIncBk/sade/src/dart/Dart/server/src/ccmd/catalog/messages/STATUS/TEST.msg Table 7 below illustrates test results of the incremental backup method according to embodiments of the present disclosure, wherein the set of file paths includes 821,025 paths (totally 87,584,412 characters, 87.58 M bytes). It is seen from Table 7 that compared with the traditional fast sort, the prefix tree sorting only consumes a memory of about 49.6 MB, which can save 51.2% storage space, wherein the memory consumed by the fast sort includes the character string per se, pointer array, and stack size consumed in extreme circumstances.

TABLE 7

| Sort method | Consumed memory (byte) |
| --- | --- |
| Fast sort | 100,720,621≈96 MB |
| Prefix tree insertion | 49,216,71≈46.9 MB |

Figure 5:
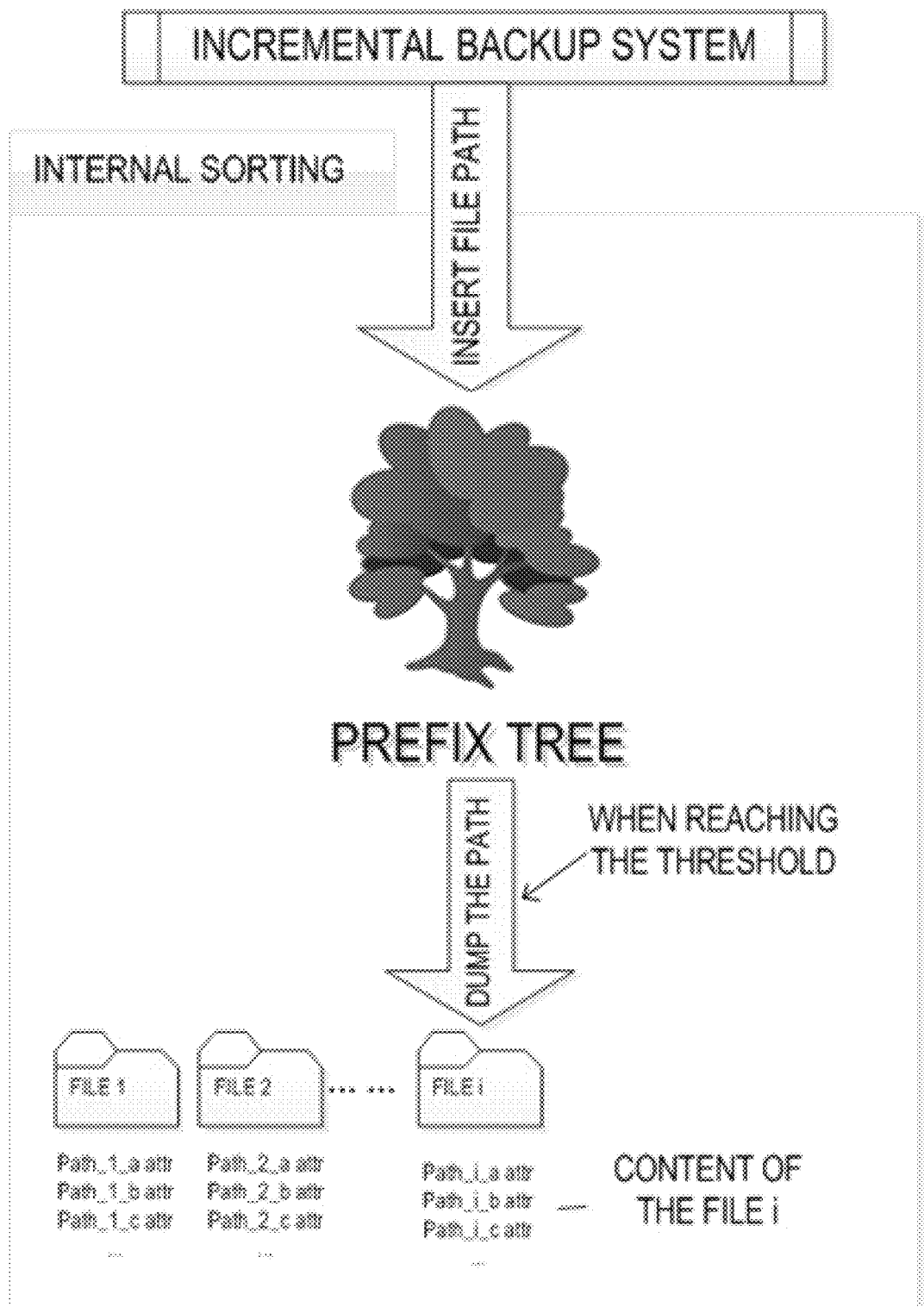
FIG. 5 schematically illustrates an example process of sorting file paths according to another embodiment of the present disclosure.

FIG. 5 schematically illustrates an example process of sorting file paths according to another embodiment of the present disclosure. In the example of FIG. 5, if the amount of sets of file paths is very huge (such as more than 100,000 paths), a threshold is set for the size of each prefix tree. Once the threshold is reached, segmentation will be performed to the set of file paths, that is, each file path in the set of file paths segment is parsed by segment so as to construct a plurality of prefix trees. Then, an ordered set of paths for each prefix is read to generate corresponding files (such as file 1, file 2, . . . , file i), and then these files are dumped to the disk. After all paths are completely processed, the set of paths in all the files are integrated and sorted again using other sorting methods, such as K-way merge algorithm.

Figure 6:
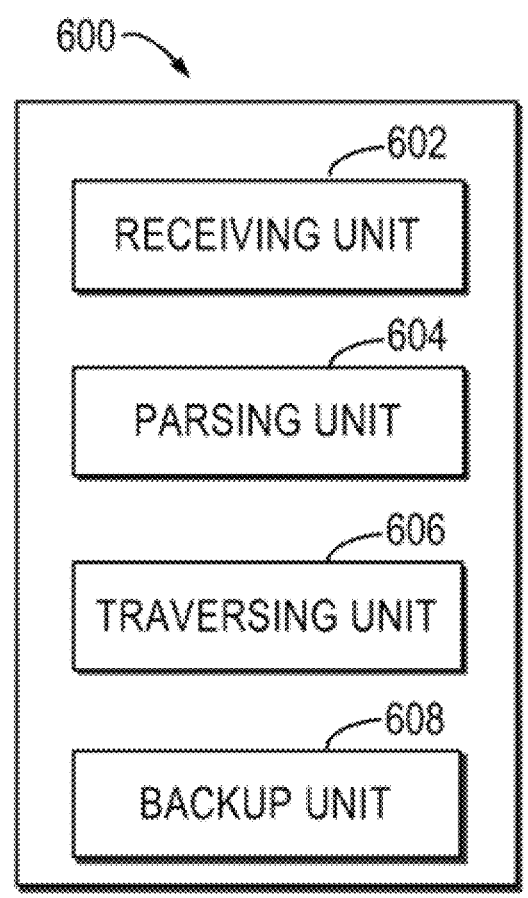
FIG. 6 schematically illustrates a block diagram of an apparatus 600 for incremental backup according to embodiments of the present disclosure.

FIG. 6 schematically illustrates a block diagram of an apparatus 600 for incremental backup according to embodiments of the present disclosure, the apparatus 600 comprises a receiving unit 602 configured to receive a set of file paths to be backed up and a parsing unit 604 configured to parse each file path in the set of file paths to construct a prefix tree. The apparatus 600 further comprises a traversing unit 606 configured to traverse the prefix tree to read an ordered set of file paths in the prefix tree and a backup unit 608 configured to perform an incremental backup sequentially according to the ordered set of file paths.

According to one embodiment of the present disclosure, the file paths to be backed up at least include an alphabet and a special character. According to another embodiment of the present disclosure, all sub-nodes of any node in the prefix tree have a common prefix that includes one or more characters. According to a further embodiment of the present disclosure, the prefix tree is initially an empty tree.

According to one embodiment of the present disclosure, the parsing unit 604 is further configured to: insert each file path in the set of file paths into the prefix tree sequentially; and in response each file path being inserted, compare each file path with the prefix tree. According to another embodiment of the present disclosure, the parsing unit 604 is further configured to allocate common prefix of a plurality of file paths having the common prefix to a node, wherein the common prefix includes a plurality of characters.

According to one embodiment of the present disclosure, the parsing unit 604 is further configured to: for each file path, perform prefix matching between the file path and nodes of a N-th layer in the prefix tree, wherein N≥1 and an initial value of N is 1; if no common prefix is found between the file path and all nodes in the N-th layer, insert the file path as a new node of the N-th layer; and if a common prefix is found between the file path and given node of the N-th layer, insert the file path as a new sub-node of the given node so that initial characters of all nodes of N+1-th layer are sorted according to ASCII code sizes. According to another embodiment of the present disclosure, the parsing unit 604 is further configured to replace characters in the given node with the common prefix in response to the common prefix being a part of the characters in given node.

According to embodiments of the present disclosure, the parsing unit 604 is further configured to sort all nodes in the same layer based on ASCII code sizes of the initial characters in the nodes while constructing the prefix tree. According to a further embodiment of the present disclosure, the parsing unit 604 is further configured to assign a value to a node corresponding to a file path while constructing the prefix tree.

According to one embodiment of the present disclosure, the traversing unit 606 is configured to traverse a prefix tree using a depth first search in order to read sequentially all nodes that have values as the ordered set of file paths.

It should be understood that the apparatus 600 may be implemented in various manners. For example, in some embodiments, the apparatus 600 may be implemented in hardware, software or a combination of hardware and software, wherein the hardware part can be implemented by a specific logic, the software part can be stored in a memory and executed by a proper instruction execution system such as a microprocessor or a dedicated designed hardware. Those skilled in the art may appreciate that the above method and apparatus can be implemented with a computer-executable instructions and/or control codes contained in the processor, for example, such codes provided on a carrier medium such as a magnetic disk, CD, or DVD-ROM, or a programmable memory such as a read-only memory or a data carrier such as an optical or electronic signal carrier. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software.

It should be noted that although the detailed depiction above mentions several units or sub-units of the apparatus, such partition is only example, rather than non-compulsory. In actuality, the features and functions of two or more means depicted above may be instantiated in one means. In turn, features and functions of one means described above may be further partitioned into more means so as to be instantiated.

Figure 7:
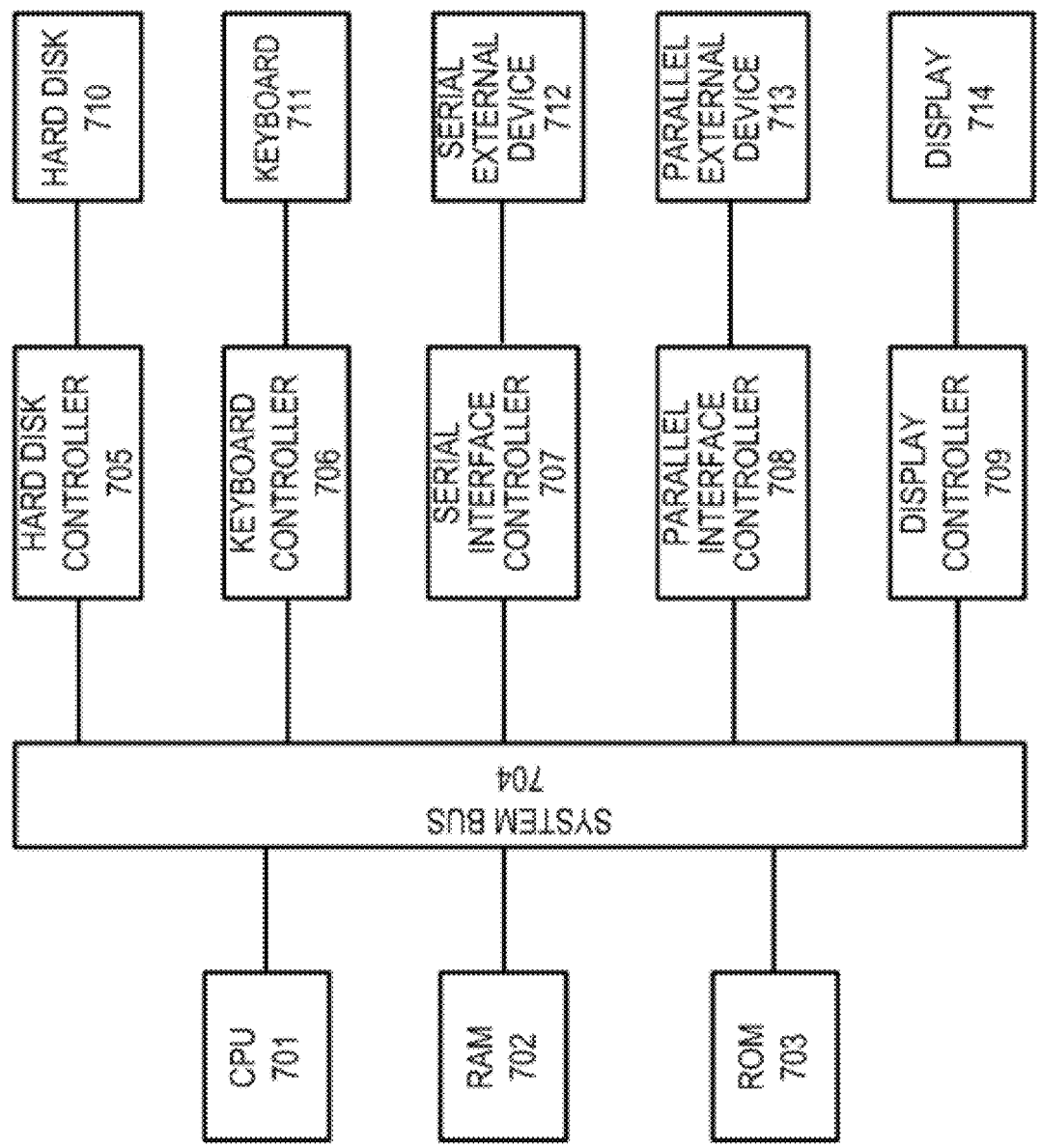
FIG. 7 schematically illustrates a block diagram of a computer device 700 in which embodiments of the present disclosure may be implemented.

Hereinafter, a computer device in which embodiments of the present disclosure may be implemented will be described with reference to FIG. 7. FIG. 7 schematically illustrates a block diagram of a computer device 700 in which embodiments of the present disclosure may be implemented.

The computer system as shown in FIG. 7 comprises: a CPU (central processing unit) 701, a random access memory (RAM) 702, a read only memory (ROM) 703, a system bus 704, a hard disk controller 705, a keyboard controller 706, a serial interface controller 707, a parallel interface controller 708, a display controller 709, a hard disk 710, a keyboard 711, a serial external device 712, a parallel external device 713 and a display 714. In these devices, what are coupled to the system bus 704 include the CPU 701, the RAM 702, the ROM 703, the hard disk controller 705, the keyboard controller 706, a serial interface controller 707, a parallel interface controller 708, and a display controller 709. The hard disk 710 is coupled to the hard disk controller 705, the keyboard 711 is coupled to the keyboard controller 706, the serial external device 712 is coupled to the serial interface controller 707, the parallel external device 713 is coupled to the parallel interface controller 708, and the display 714 is coupled to the display controller 709. It should be understood that the structural block diagram as shown in FIG. 7 is only illustrated for example purposes, not for limiting the scope of the present invention. In some cases, some devices may be added or reduced according to the needs. Embodiments of the present disclosure may be stored as computer program codes in a storage device such as the hard disk 710 on the computer. The computer program codes, when loaded into for example an RAM to run, cause the CPU 701 to perform a method for incremental backup according to embodiments of the present disclosure.

The present descriptions above are only optional embodiments, not intended to limit the present disclosure. To those skilled in the art, embodiments of the present disclosure may have various modifications and variations. Any modifications, equivalent replacements, and improvements within the spirit and principle of embodiments of the present disclosure should be included within the protection scope of embodiments of the present disclosure.

What is claimed is:

1. A method for incremental backup, comprising:
   receiving a set of file paths to be backed up;
   setting a threshold according to a size associated with a prefix tree;
   in response to reaching the threshold, parsing, by segment, each file path in the set of file paths to construct the prefix tree, wherein the parsing of each file path in the set of file paths to construct a prefix tree comprises:
     inserting each file path in the set of file paths into the prefix tree sequentially; and
     in response to each file path being inserted, comparing each file path with the prefix tree, wherein a comparison time respective to the inserting of each file path is dependent upon a length of a character string;
   traversing the prefix tree to read an ordered set of file paths in the prefix tree, wherein traversing the prefix tree to read the ordered set of file paths in the prefix tree comprises:
     traversing the prefix tree using a depth first search to sequentially read all nodes that have values as the ordered set of file paths, wherein if after using the depth first search a traversed node is found to be an end of a file path, then a plurality of characters strings included in all the nodes along the file path from a root node to a given node merge to form a single file path; and
   performing an incremental backup sequentially according to the ordered set of file paths.

2. The method according to claim 1, wherein the file paths to be backed up at least include an alphabet and a special character.

3. The method according to claim 1, wherein all sub-nodes of any node in the prefix tree have a common prefix that includes one or more characters.

4. The method according to claim 1, wherein the prefix tree is initially an empty tree.

5. The method according to claim 1, wherein the parsing each file path in the set of file paths to construct a prefix tree comprises:
   allocating a common prefix of a plurality of file paths having the common prefix to a node, the common prefix including a plurality of characters.

6. The method according to claim 1, wherein the comparing each file path with the prefix:
   for each file path, performing prefix matching between the file path and nodes of a N-th layer in the prefix tree, wherein N≥1 and an initial value of N is 1:
   in response to failing to find a common prefix between the file path and all nodes of the N-th layer, inserting the file path as a new node of the N-th layer; and
   in response to finding a common prefix between the file path and a given node in the N-th layer, inserting the file path as a new sub-node of the given node so that initial characters of all nodes of N+1-th layer are sorted according to ASCII code sizes.

7. The method according to claim 6, wherein the inserting the file path as a new sub-node of the given node comprises:
   in response to the common prefix being a part of characters in given node, replacing characters in the given node with the common prefix.

8. The method according to claim 1, further comprising:
   in response to constructing the prefix tree, sorting all nodes in the same layer based on ASCII code sizes of initial characters in the nodes.

9. The method according to claim 1, further comprising:
   in response to constructing the prefix tree, assigning a value to a node corresponding to a file path.

10. The method according to claim 9, wherein all nodes on the file path from a root node to a given node of the prefix tree comprises a sum of the value of a plurality of character strings.

11. A computing system including a processor and memory configured to perform operations comprising:
  receiving a set of file paths to be backed up;
  setting a threshold according to a size associated with a prefix tree;
  in response to reaching the threshold, parsing, by segment, each file path in the set of file paths to construct the prefix tree, wherein the parsing of each file path in the set of file paths to construct a prefix tree comprises:
    inserting each file path in the set of file paths into the prefix tree sequentially; and
    in response to each file path being inserted, comparing each file path with the prefix tree, wherein a comparison time respective to the inserting of each file path is dependent upon a length of a character string;
  traversing the prefix tree to read an ordered set of file paths in the prefix tree, wherein traversing the prefix tree to read the ordered set of file paths in the prefix tree comprises:
    traversing the prefix tree using a depth first search to sequentially read all nodes that have values as the ordered set of file paths, wherein if after using the depth first search a traversed node is found to be an end of a file path, then a plurality of characters strings included in all the nodes along the file path from a root node to a given node merge to form a single file path; and
  performing an incremental backup sequentially according to the ordered set of file paths.

12. The computing system according to claim 11, wherein the file paths to be backed up at least include an alphabet and a special character.

13. The computing system according to claim 11, wherein all sub-nodes of any node in the prefix tree have a common prefix that includes one or more characters.

14. The computing system according to claim 11, wherein the prefix tree is initially an empty tree.

15. The computing system according to claim 11, further configured to perform operations comprising:
  allocate a common prefix of a plurality of file paths having the common prefix to a node, the common prefix including a plurality of characters.

16. The computing system according to claim 15, further configured to perform operations comprising:
  for each file path, perform prefix matching between the file path and nodes of a N-th layer in the prefix tree, wherein N≥1 and an initial value of N is 1:
    in response to failing to find a common prefix between the file path and all nodes in the N-th layer, insert the file path as a new node of the N-th layer; and
    in response to finding a common prefix between the file path and a given node in the N-th layer, insert the file path as a new sub-node of the given node so that initial characters of all nodes of N+1-th layer are sorted according to ASCII code sizes.

17. The computing system according to claim 16, further configured to perform operations comprising:
  in response to the common prefix being a part of characters in given node, replace characters in the given node with the common prefix.

18. A computer program product residing on a non-transitory computer readable program instructions embodied therein, the computer readable program instructions, when being executed by a processor, cause the processor to execute:
  receiving a set of file paths to be backed up;
  setting a threshold according to a size associated with a prefix tree;
  in response to reaching the threshold, parsing, by segment, each file path in the set of file paths to construct the prefix tree, wherein the parsing of each file path in the set of file paths to construct a prefix tree comprises:
    inserting each file path in the set of file paths into the prefix tree sequentially; and
    in response to each file path being inserted, comparing each file path with the prefix tree, wherein a comparison time respective to the inserting of each file path is dependent upon a length of a character string;
  traversing the prefix tree to read an ordered set of file paths in the prefix tree, wherein traversing the prefix tree to read the ordered set of file paths in the prefix tree comprises:
    traversing the prefix tree using a depth first search to sequentially read all nodes that have values as the ordered set of file paths, wherein if after using the depth first search a traversed node is found to be an end of a file path, then a plurality of characters strings included in all the nodes along the file path from a root node to a given node merge to form a single file path; and
  performing an incremental backup sequentially according to the ordered set of file paths.

* * * * *